Patented Aug. 26, 1924.

1,506,081

UNITED STATES PATENT OFFICE.

ADRIEN E. REGNIER, OF REVERE, MASSACHUSETTS, ASSIGNOR OF ONE-HALF TO REGINALD W. BIRD, OF FRAMINGHAM, MASSACHUSETTS.

CASEIN SIZE AND METHOD OF PRODUCING SAME.

No Drawing. Application filed August 31, 1921. Serial No. 497,325.

*To all whom it may concern:*

Be it known that I, ADRIEN E. REGNIER, a citizen of the United States, residing at Revere, in the county of Suffolk and State of Massachusetts, have invented new and useful Improvements in Casein Size and Methods of Producing the Same, of which the following is a specification.

This invention has for its object to produce a size for use in the treatment of paper, either for coating the same or for admixture with coloring matter in the printing of wall paper.

As is well known, casein, as produced commercially, has been used for paper sizing, but it has not heretofore been possible to use it in wall papers, for example, wherein the coloring matter, used for coating or printing the paper, has an acid reaction. This is due to the fact that, in the conversion of the casein which is normally water-insoluble, into an aqueous adhesive solution, it has been necessary to convert or digest the casein with an alkali of the nature of ammonia, sodium carbonate, sodium borate or trisodium phosphate, so that the solution is distinctly alkaline in reaction. Consequently, when an alkaline casein solution is brought into contact with the "pulp" containing the coloring matter and having an acid reaction, the acid had a coagulating action on the casein and the alkali in the casein had a tendency to neutralize the acid in the coloring matter and to change the color thereof. For example, the "pulp" so-called, used in the production of wall papers, contains in most cases barium chloride, or sodium sulphate, and aniline dye; and, when such pulp comes in contact with the casein solution, as for example when a green colored pulp is employed, the casein is coagulated and precipitated, and, if sufficient alkali to prevent coagulation is used, the color of the pulp gradually changes from green to yellowish green. Consequently it has heretofore been universally the practice, in the production of wall papers and the like, to employ a size consisting of animal glue or a starch glue. Since such glues are water-soluble, the result is that, when wall papers are wet, the colors run, and in addition it is easy, even when the papers are dry, to rub off or remove the coloring matter from the surface thereof.

The present invention has for its object to produce a casein size, which is water-insoluble when dry and with which the ordinary coloring matters or pulp may be used.

I have found that casein, which has been originally coagulated and precipitated by hydrochloric acid, may be converted to an aqueous paste by sodium fluoride, the viscosity of the product depending upon the quantity of water used; and that the size thus produced may be used for coating papers or for admixture with the pulp or coloring matter for coating or printing paper. With less beneficial results, casein, which has been originally precipitated by sulphuric acid and the curd cooked, may also be converted into an aqueous solution for the uses mentioned; but, inasmuch as the casein is more difficultly converted, the solution must be strained to remove the unconverted portions of the casein with a corresponding loss in production. When the casein size has thus been produced by the conversion of the casein with sodium fluoride, the size has an acid reaction, and consequently the acid of the coloring matter has no coagulating or precipitating effect thereon, and the size does not in turn have any chemical reaction with the coloring matter. When the water is removed from the size, the casein is water-resistant or water-insoluble, thereby tending to make water-resistant the paper or the coloring matter with which it is mixed.

In the initial production of the casein, the skimmed milk is permitted to sour to a certain point of acidity, whereupon hydrochloric acid is added and stirred into the milk thoroughly, with the result that the milk curdles. The curd settles to the bottom of the vat and the whey is then drawn off. Following this operation, the curd is washed with fresh water, is then bag-pressed, more or less comminuted and dried. Thereafter the dried casein is ground to fairly small size and is ready for use in the manufacture of size. If it is desired to use casein which has been coagulated or precipitated by the use of sulphuric acid, the curd is cooked in accordance with the usual process and then pressed and dried as previously described.

As an example of practicing my process, one may proceed as follows: To 100 pounds of commercial casein, produced as hereinbefore described, may be added 400 pounds of water and a suitable quantity of sodium fluoride,—say 8 to 16 pounds. The quantity of sodium fluoride which may be used varies within relatively wide ranges. These ingredients are mixed together at ordinary temperature in a mixing vat with sufficient agitation to ensure a thorough admixture. The action of the sodium fluoride on the casein is to convert it with water into a solution, the viscosity of which depends upon the quantity of water employed. To hasten the conversion, the mixture may be heated, during the agitation, to a temperature of about 160° F., after which it is permitted to cool to about 90° F. The size, which is thus produced, may be paper, or it may be mixed with the pulp or coloring matter in suitable proportions. The mixture may be employed for surface coating or it may be used in the printing of designs.

Ordinarily, for shipment, the casein is mixed with a suitable proportion of sodium fluoride in a dry form and shipped as a base in this condition to the place of use, where water may be added and the process previously described followed for the production of the size. The size thus produced may thus be used in the coating or printing of wall paper, or employed for sizing, coating or printing of various kinds of paper.

Inasmuch as the size has an acid reaction, there is, as previously stated, no chemical reaction between the size and the coloring matter, nor is there a precipitation or coagulation of the casein due to the presence of acids in the coloring matter. Sometimes it is desirable to increase the "flowing" properties of the size, and for this purpose various suitable materials may be added thereto. For example, I have discovered that ammonium oxalate or trisodium phosphate, or with less beneficial results potassium oxalate, may be employed for the purpose. While the viscosity of the size may be decreased by the addition of water thereto, nevertheless water also decreases the adhesive properties thereof; whereas, by using ammonium oxalate or trisodium phosphate, the viscosity of the size may be decreased without decreasing its adhesiveness. In particular, ammonium oxalate has the property of retarding the coagulation of the coloring matter with which the size is mixed and permits it to be spread more uniformly in coating or printing. These materials, thus used for increasing the flowing properties of the size, may be added in a dry state to the base or mixture of casein and sodium fluoride for shipment to the point of use.

One of the decided advantages, incident to a size such as herein described, is that it is free flowing and produces a smooth, satiny finish. It enables one to obtain a finer finish when used as a size or coating than has heretofore been secured in those sizes wherein casein has been employed as the base material. For example, when used as a size with "satin white" so-called, a much finer and more velvety finish is secured than has heretofore been possible. When used with bronze, steel blue, copper bronze or the like, the size, owing to its having an acid reaction, increases and brings out the brightness or the luster or the finishing properties of the materials named.

A composition, such as herein described, has many other uses which will readily suggest themselves to those skilled in the art.

What I claim is:—

1. The herein described process of producing a size or glue which consists in dissolving an acid-precipitated casein with sodium fluoride in the presence of water into a fluid adhesive state.

2. The process of producing a size or glue which comprises agitating a mixture of acid-precipitated casein, sodium fluoride, and water at an elevated temperature.

3. A process of producing a size or glue, which comprises the coagulation and precipitation of casein with hydrochloric acid, followed by the drying of the precipitated casein, and the conversion of such casein into an adhesive state by the use of sodium fluoride.

4. A process of producing a free-flowing size, which comprises converting casein having an acid reaction with sodium fluoride in the presence of a substance which gives to the product the property of "free" flowing.

5. A process of producing a free-flowing size, which comprises converting casein having a non-alkaline reaction with sodium fluoride in the presence of ammonium oxalate.

6. A non-alkaline size or glue consisting of acid-precipitated casein converted into adhesive condition by sodium fluoride in the presence of water.

7. An adhesive size or glue consisting of an aqueous solution of mineral-acid-precipitated casein and sodium fluoride.

8. An adhesive size or glue consisting of an aqueous solution of casein, sodium fluoride and a substance which decreases the viscosity of the size without decreasing its adhesiveness.

9. A base for the manufacture of an adhesive size comprising a dry mixture of mineral-acid-precipitated casein and sodium fluoride.

10. A base for the manufacture of an adhesive size consisting of a dry mixture of casein, sodium fluoride and ammonium oxalate.

11. A base for the manufacture of an adhesive size or glue, comprising a dry mixture of hydrochloric-acid-precipitated casein, and sodium fluoride.

12. A base for the manufacture of an adhesive size or glue, consisting of a dry mixture of hydrochloric-acid-precipitated casein, sodium fluoride, and ammonium oxalate.

13. A coated or printed product in which the coating or printing composition includes a non-alkaline size comprising casein converted into a soluble state by sodium fluoride.

In testimony whereof I have affixed my signature.

ADRIEN E. REGNIER.